United States Patent
Lam

(10) Patent No.: US 10,609,134 B2
(45) Date of Patent: Mar. 31, 2020

(54) PROVIDING APPLICATION VIRTUALIZATION USING A PEER-TO-PEER MODEL

(71) Applicant: Wyse Technology L.L.C., Santa Clara, CA (US)

(72) Inventor: Mandy Sui Mei Lam, San Jose, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 201 days.

(21) Appl. No.: 15/080,067

(22) Filed: Mar. 24, 2016

(65) Prior Publication Data

US 2017/0279879 A1 Sep. 28, 2017

(51) Int. Cl.
*H04L 29/08* (2006.01)

(52) U.S. Cl.
CPC ............ *H04L 67/104* (2013.01); *H04L 67/16* (2013.01)

(58) Field of Classification Search
USPC ........................................................ 709/203
See application file for complete search history.

(56) References Cited

U.S. PATENT DOCUMENTS

| | | | | |
|---|---|---|---|---|
| 7,644,150 B1* | 1/2010 | Nucci | ................. | H04L 41/0893 706/12 |
| 8,688,775 B2* | 4/2014 | Penno | .................. | H04L 67/104 709/201 |
| 2014/0380079 A1* | 12/2014 | Katano | ............... | G06F 11/1441 713/330 |
| 2015/0063346 A1* | 3/2015 | Eswara | ................. | H04L 65/103 370/352 |
| 2015/0245393 A1* | 8/2015 | Lee | ........................ | H04W 8/005 370/338 |
| 2015/0271268 A1* | 9/2015 | Finkelstein | ............. | H04L 67/12 370/400 |
| 2016/0337437 A1* | 11/2016 | Gartsbein | ............... | H04L 67/06 |
| 2017/0220420 A1* | 8/2017 | Kaushik | ................. | G06F 16/23 |

OTHER PUBLICATIONS

Sumi Helal, Nitin Desai, Varun Verma and Choonhwa Lee, "Konark—A Service Discovery and Delivery Protocol for Ad-Hoc Networks", 0-7803-7700-1/03, 2003 IEEE.*

* cited by examiner

*Primary Examiner* — Brian Whipple
*Assistant Examiner* — John Fan
(74) *Attorney, Agent, or Firm* — Kirton McConkie; Brian Tucker

(57) ABSTRACT

Virtualized applications can be delivered using a peer-to-peer model. Each client in a virtual desktop infrastructure environment can function as both a server and a client for purposes of distributing and receiving application layers. A server component on each client can advertise any application layers that the client maintains in its local storage and can receive and service streaming requests from other clients. A client component on each client can discover each application layer that is available within its location including which client provides each application layer. The client component can therefore also be configured to request application layers from the appropriate clients. This peer-to-peer model eliminates the need to provide a dedicated server at each location. Also, because a server component on the client will only be tasked with streaming to a limited number of clients, virtually any client can function as the source of an application layer.

20 Claims, 9 Drawing Sheets

PROVIDING APPLICATION VIRTUALIZATION USING A PEER-TO-PEER MODEL

CROSS-REFERENCE TO RELATED APPLICATIONS

N/A

BACKGROUND

Application virtualization is a technique for delivering an application from a server to a client on demand. With application virtualization, the application is encapsulated in some form of a package or container and stored on the server. Then, when a user desires to run the application on the client, the server delivers (or streams) the application to the client where it can be executed locally. This is in contrast to remote desktop techniques where the application would actually be executed on the server with only its user interface being delivered to the client.

Various different techniques have been employed to package and deliver applications. For example, Dell Wyse's vWorkSpace WSM product employs "layers" as the containers for segregating resources such as files, folders, registry data, and related metadata. An application layer can contain all resources needed to load and execute an application on a client (e.g., the application's .exe and a registry hive containing appropriate registry settings). In some cases, such layers can be stored as a vDisk (e.g., a Virtual Hard Disk (VHD) or .vhd file). Accordingly, when a client desires to access an application that is virtualized, the central server can deliver the appropriate application layer (e.g., a .vhd file that includes all resources necessary to execute Microsoft Word) to the client where it can be mounted. Once the application layer is mounted, the contents of the application layer will be accessible in a typical manner. In fact, the client-side components can even abstract the fact that the application layer is a separate vDisk by employing file system filter techniques that cause the contents of the vDisk to appear as if they were stored in the local file system. Once the user is finished using the application (e.g., when the user logs off of the client), the application layer can be unmounted from the client. In this way, the resources of the application layer will not remain accessible on the client if another user were to log in.

One benefit of application virtualization is that it allows the applications to be stored and maintained centrally. For example, an application layer in the form of a .vhd file can be stored on a central server and delivered to any number of clients on demand. The application layer therefore provides a single location that can be updated as necessary. In many implementations, especially in large organizations having many locations, a central server in the organization's headquarters may be employed to store and maintain the application layers. Each other location may then include a separate server that is configured to obtain application layers from the central server and provide them to the clients at their location.

One problem with this architecture is that it requires a dedicated server at each location. Also, to avoid having a single point of failure, most organizations would typically employ more than one server at each location. This can greatly increase the cost and overhead associated with providing application virtualization. In many cases, this cost and overhead are prohibitive, especially to smaller organizations.

BRIEF SUMMARY

The present invention extends to methods, systems, and computer program products for delivering virtualized applications using a peer-to-peer model. Each client in a virtual desktop infrastructure (VDI) environment can function as both a server and a client for purposes of distributing and receiving application layers. A server component on each client can advertise any application layers that the client maintains in its local storage and can receive and service streaming requests from other clients. A client component on each client can discover each application layer that is available within its location including which client provides each application layer. The client component can therefore also be configured to request application layers from the appropriate clients.

This peer-to-peer model eliminates the need to provide a dedicated server at each location to stream all application layers. Also, because a server component on the client will only be tasked with streaming to a limited number of clients, virtually any client can function as the source of an application layer. However, even with this distributed peer-to-peer model, a central server may still be employed as the original source of application layers and can be tasked with ensuring that application layers are evenly distributed among the clients at a particular location. In this way, application layers can still be managed from a central location without the cost and overhead associated with a client/server distribution model for streaming the virtualized applications.

In one embodiment, the present invention is implemented as a method for providing application virtualization using a peer-to-peer model. A discovery service on a client device can send a communication to an advertising service on each of a number of other client devices. The communication can request an identification of any application layers that the other client device maintains. The discovery service can receive, from the advertising services on each of a number of other client devices, an identification of each application layer that the corresponding client device maintains. Based on the received identifications, a map of which application layers are available on which other client devices can be maintained. In response to a request to access an application on the client device, the map can be accessed to identify which other client device maintains an application layer containing the application. The application layer can then be requested from the identified other client device. Then, the application layer can be enabled to be accessed on the client device such that the application can be executed on the client device.

In another embodiment, the present invention is implemented as computer storage media storing computer executable instructions which when executed implement a layering module on a client device. The layering module includes a server component and a client component. The server component can include: an advertising service that is configured to identify which application layers are stored locally on the client device and to respond to requests from other client devices to provide an identification of the locally stored application layers; and a streaming service that is configured to deliver the application layers to the other client devices. The client component can include: a discovery service that is configured to communicate with the advertising service on the other client devices to discover which application layers are locally stored on which other client devices; and one or more layer drivers that are configured to communicate with the streaming service on the other client devices to retrieve application layers stored locally on the other client devices such that one or more applications contained in each application layer that is stored locally on the other client devices can be provided as virtualized applications on the client device.

In another embodiment, the present invention can be implemented as a system for providing application virtualization using a peer-to-peer distribution model. The system can include a plurality of client devices where each client device includes a server component and a client component. The server component can include: an advertising service that is configured to identify which application layers are stored locally on the client device and to respond to requests from other client devices to provide an identification of the locally stored application layers; and a streaming service that is configured to deliver the application layers to the other client devices. The client component can include: a discovery service that is configured to communicate with the advertising service on the other client devices to discover which application layers are locally stored on which other client devices; and one or more layer drivers that are configured to communicate with the streaming service on the other client devices to retrieve application layers stored locally on the other client devices such that one or more applications contained in each application layer that is stored locally on the other client devices can be provided as virtualized applications on the client device. The system may further include a central server configured to initially distribute the application layers among the plurality of client devices.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the provision of application virtualization will be described as being carried out using application layers in the form of application vDisks. It is noted, however, that this is only one way in which a virtualized application may be distributed. The present invention should also extend to embodiments where an application and its resources may be packaged in some other container (e.g., other than as a .vhd file) for distribution between clients in a peer-to-peer fashion. Accordingly, the term "application layer" as used in the specification and the claims should be construed as encompassing a .vhd file that includes one or more applications and any required resources as well as encompassing any other structure (e.g., a different file type (such as VHDX, HDD, VMDK, etc.), a collection of files of one or more types, or one or more folders) that can contain one or more applications and any required resources and that can be distributed on demand.

Figure 1:
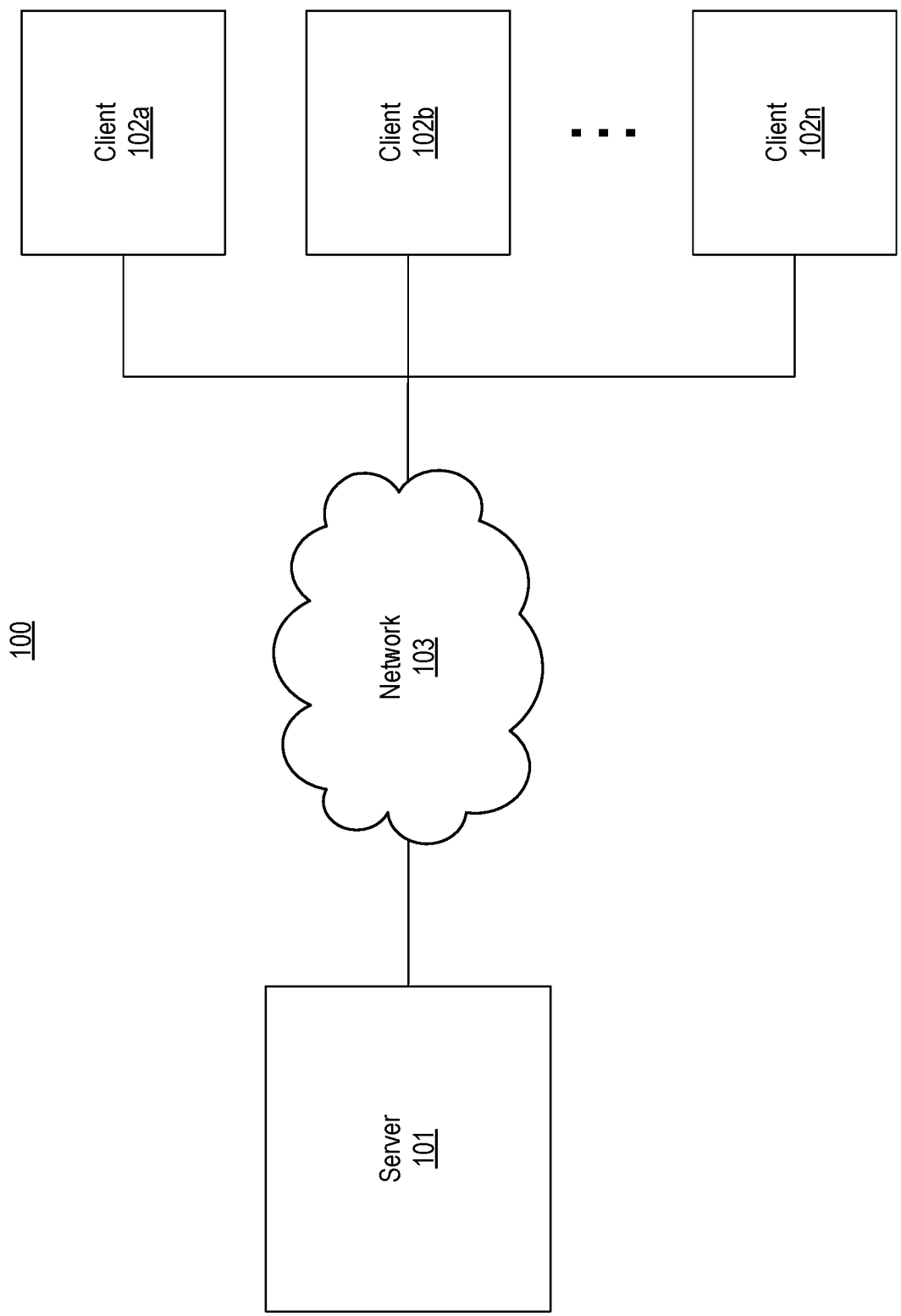
FIG. 1 illustrates an example computing environment in which the present invention may be implemented.

FIG. 1 illustrates an example computing environment 100 in which the present invention may be implemented. Computing environment 100 includes a server 101 and a number of clients 102a-102n (where n represents any number) which are interconnected via a network 103. As will be further described below, network 103 will typically be a WAN such as the internet. Although not shown in FIG. 1, clients 102a-102n would typically be part of the same LAN or part of the same subnet. Also, as will be evident from the description below, in some embodiments, the present invention could be implemented without server 101. However, a primary benefit of including server 101 is that it allows application layers to be centrally managed and initially distributed.

Clients 102a-102n can represent any type of computing device. In many embodiments, clients 102a-102n may be thin client or even zero client devices, but this need not be the case. In particular, clients 102a-102n can represent any suitable hardware that can execute the layering module described below.

Figure 2A:
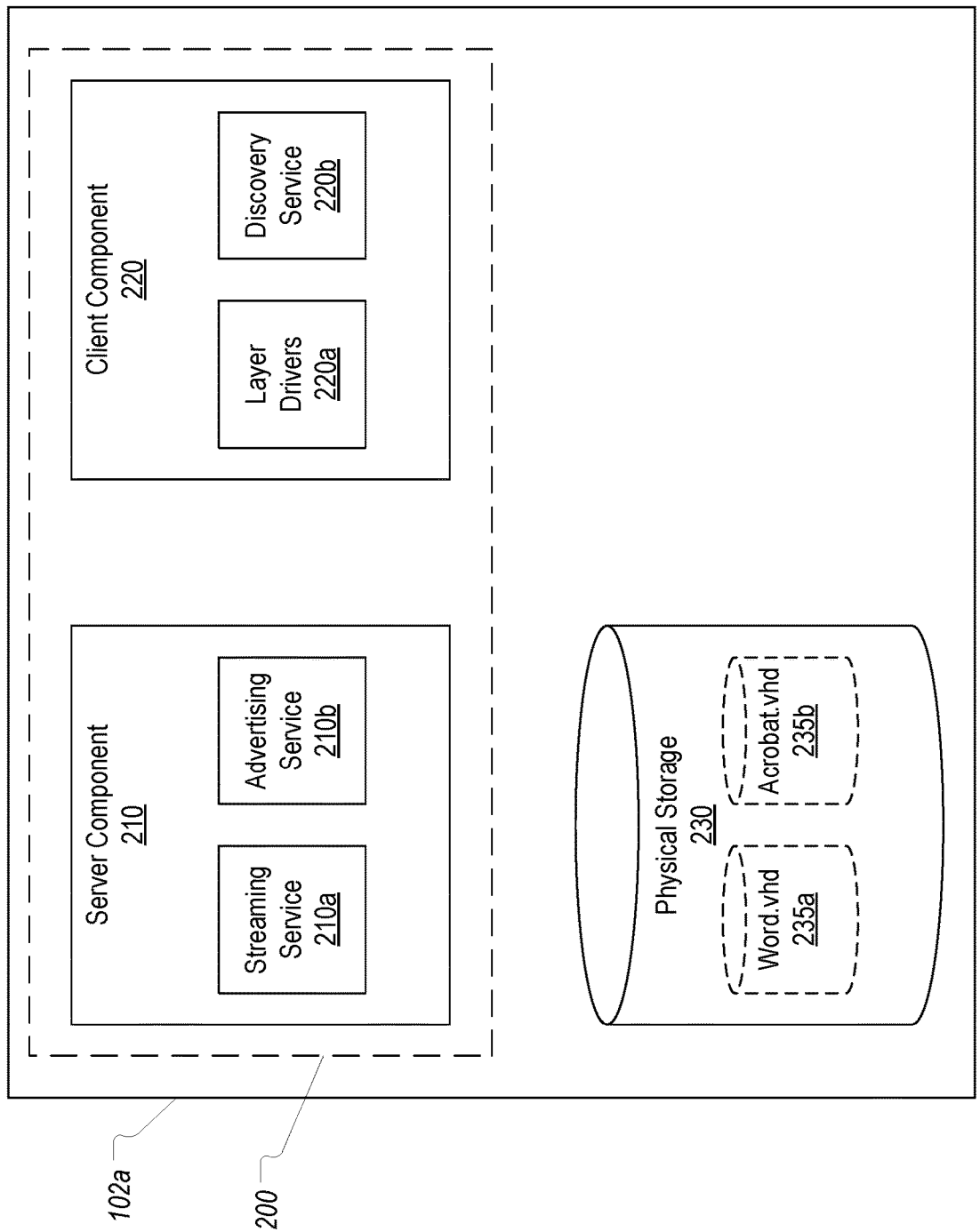
FIGS. 2A and 2B each illustrate an example of how a client can be configured to implement both a server component and a client component for purposes of distributing and obtaining applications vDisks.
Figure 2B:
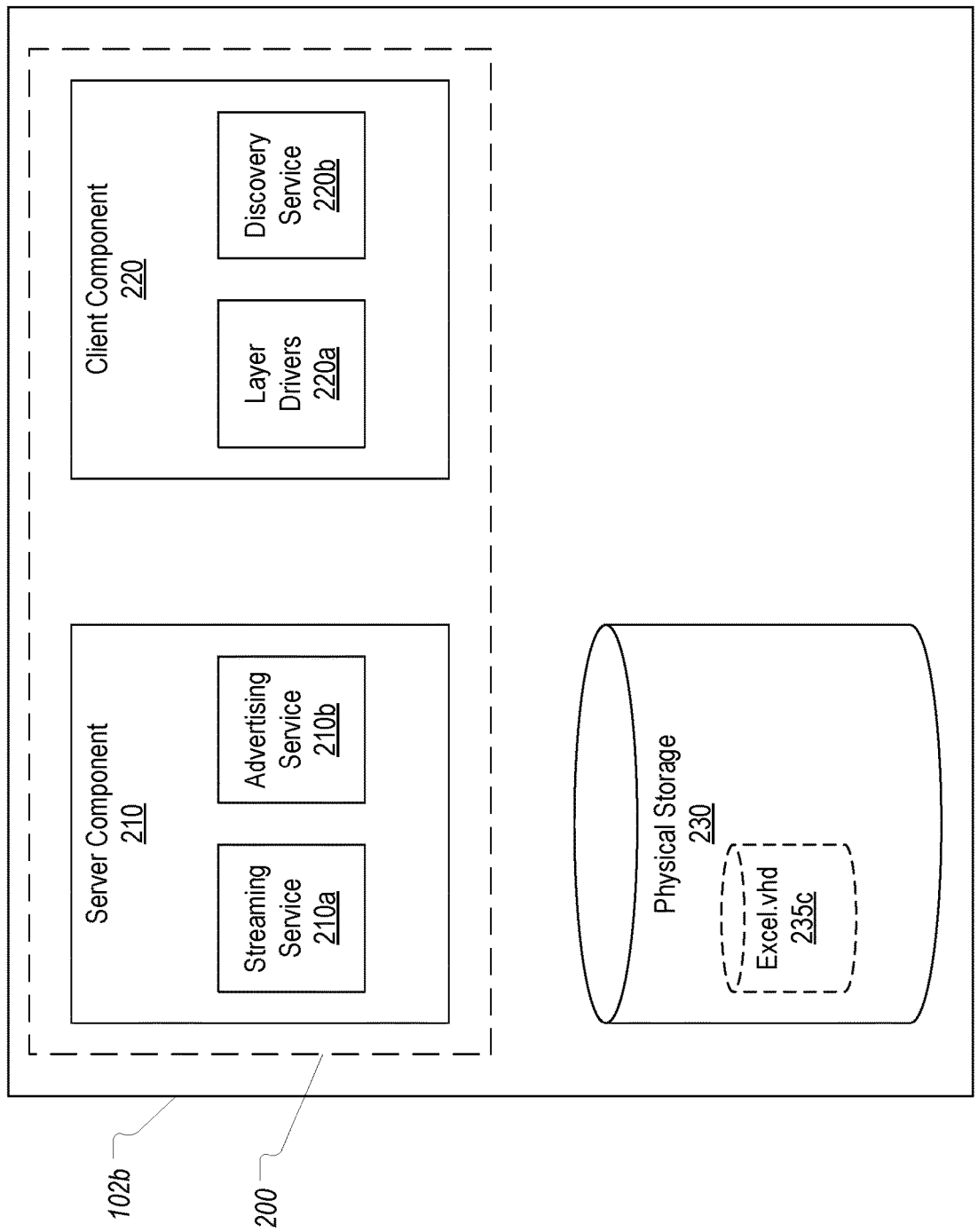

As represented in FIGS. 2A and 2B, which illustrate examples of clients 102a and 102b respectively, each of clients 102a-102n can include a layering module 200 that includes a server component 210 and a client component 220. Server component 210 can include (or implement) a streaming service 210a and an advertising service 210b while client component 220 can include one or more layer drivers 220a and a discovery service 220b. In accordance with the peer-to-peer distribution model, the application layers that are available to clients 102a-102n can be distributed among clients 102a-102n. For example, in FIG. 2A, client 102a is shown as having application layers 235a, 235b stored locally in physical storage 230, while in FIG. 2B, client 102b is shown as having application layer 235c stored locally in physical storage 230.

In this example application layers 235*a*-235*c* are depicted as three separate application vDisks (or .vhd files): Word.vhd, Acrobat.vhd, and Excel.vhd. The names of these .vhd files are intended to define the application that is contained within each file. For example, Word.vhd can contain all necessary components and resources for executing Microsoft Word. Although the example indicates that an application vDisk contains only a single application, this need not be the case. An application vDisk may include any number of applications. For example, an application vDisk may contain the entire Microsoft Office Suite or may contain a bundle of applications that are commonly used by users in a particular group.

In some embodiments of the present invention, clients 102*a* and 102*b* could have received the application vDisks from server 101 as will be further described below. Alternatively, these application vDisks could have been distributed from a local source including manually from a locally connected device. Accordingly, the particular manner in which the application vDisks are initially distributed among clients 102*a*-102*n* is not essential to the invention. What is important is that the application vDisks are distributed among a number (if not all) of clients 102*a*-102*n* so that a peer-to-peer distribution model can be efficiently implemented.

Server component 210 can be generally configured to enable the client to provide a virtualized application to other clients. Similarly, client component 220 can be generally configured to identify which other clients provide which virtualized applications and to obtain these virtualized applications from the appropriate client. By providing each of clients 102*a*-102*n* with both of these components, a peer-to-peer distribution model can be implemented.

Figure 3A:
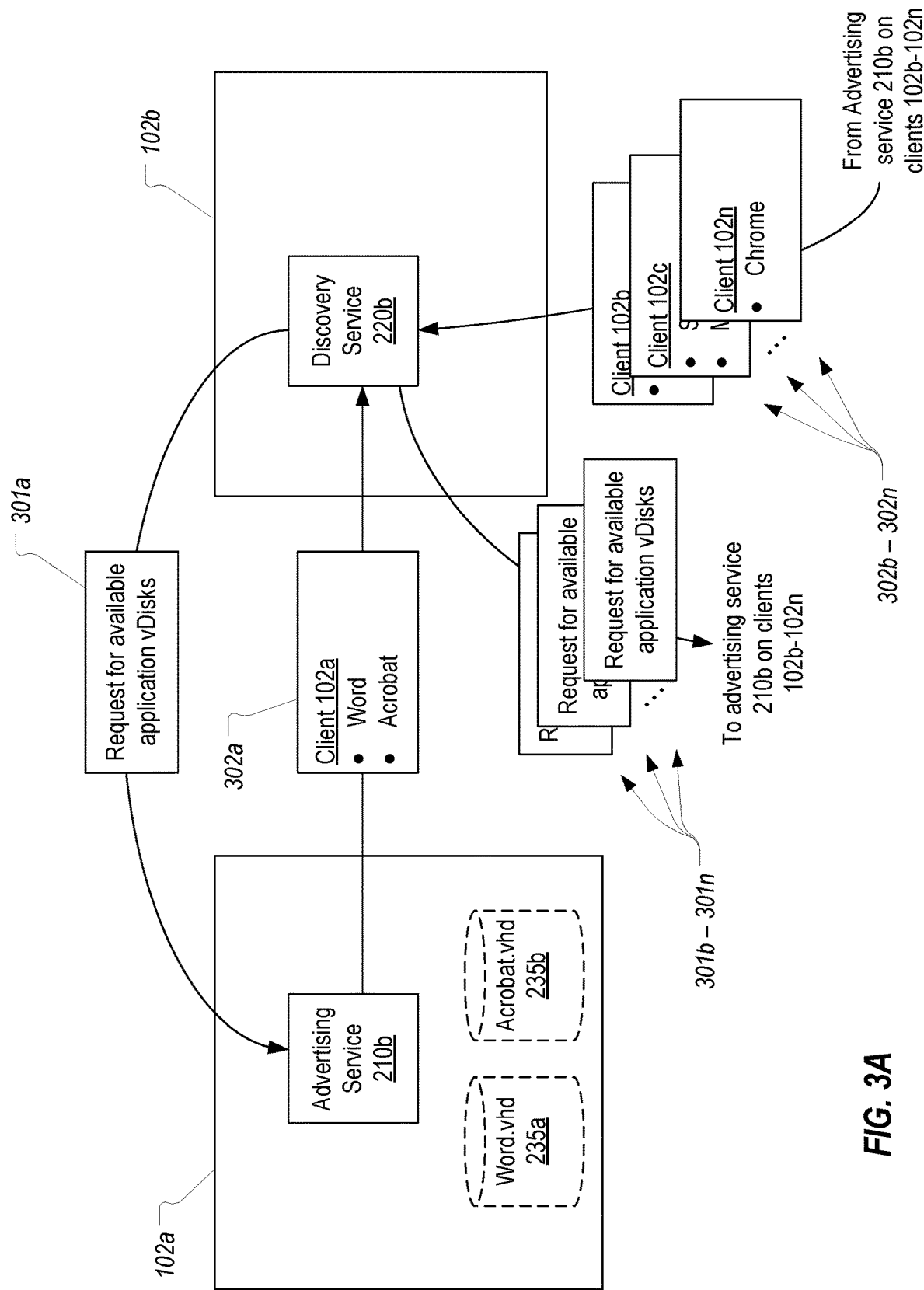
FIG. 3A illustrates how a discovery service of a client component on each client can communicate with an advertising service of a server component on each client to identify which clients provide which application vDisks.
Figure 3B:
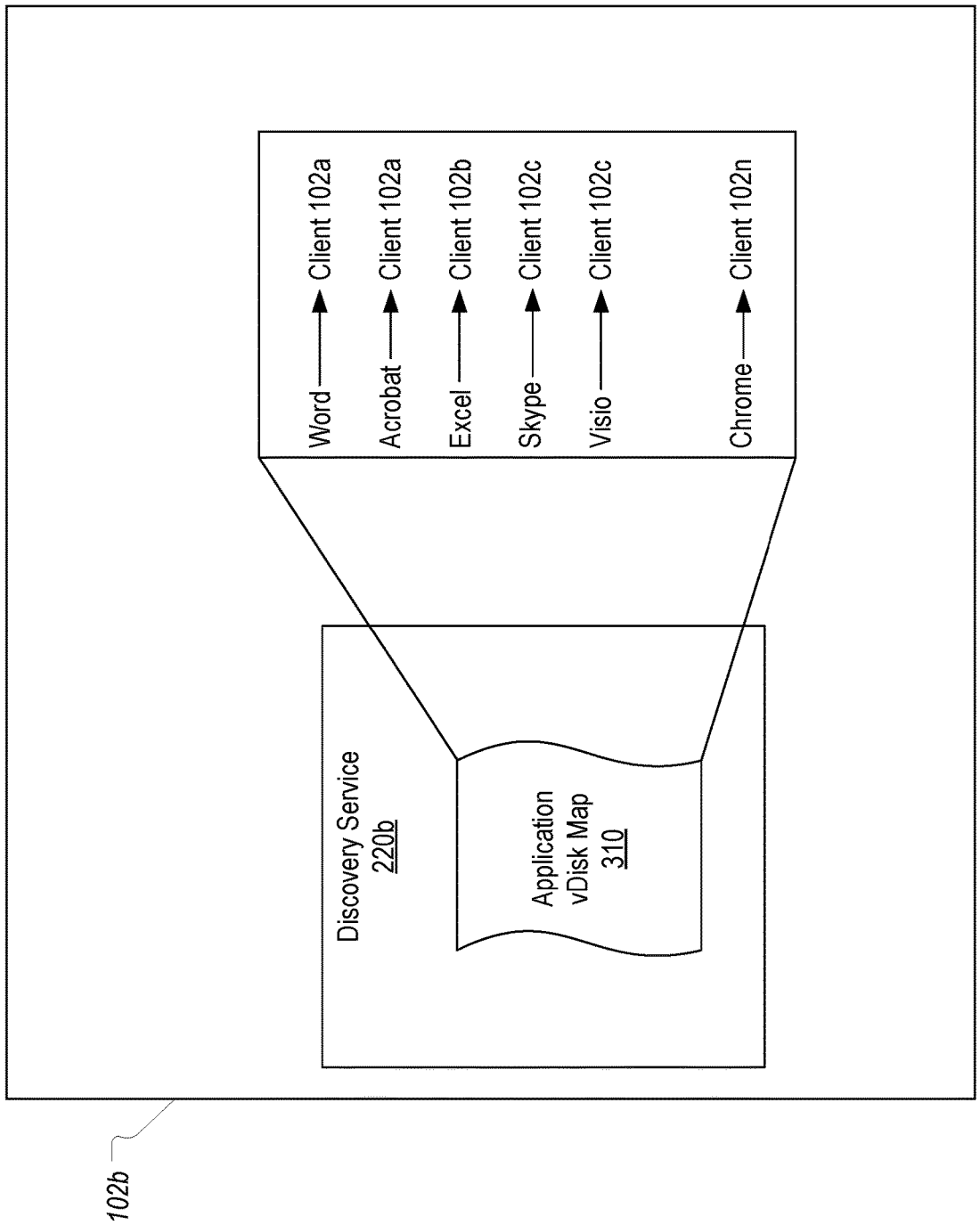
FIG. 3B illustrates how the discovery service can create an application vDisk map which identifies which client(s) can provide a particular application vDisk.

FIGS. 3A and 3B generally represent how advertising service 210*b* of server component 210 and discovery component 220*b* of client component 220 can interact to allow a client to identify which virtualized applications are available. In FIG. 3A, discovery service 220*b* on client 102*b* will be described as interfacing with advertising service 210*b* on the other clients, particularly client 102*a*. For simplicity, the other components of clients 102*a* and 102*b* will not be shown.

Advertising service 210*b* can be configured to receive communications from discovery service 220*b* on any client, including the same client on which advertising service 210*b* is executing, which request an identification of which application vDisks the client provides. As an example, advertising service 210*b* could be configured to listen for requests on a particular port of the client. For example, in FIG. 3A, discovery service 220*b* on client 102*b* is shown as sending communications 301*a*-301*n* to advertising service 210*b* on client's 102*a*-102*n* each of which requests that the advertising service identify which application vDisks the corresponding client provides. In some embodiments, communications 301*a*-301*n* can be in the form of a broadcast or multicast communication. However, communications 301*a*-301*n* could also be individually sent to each client.

In response to receiving a request to identify which application vDisks its client provides, advertising service 210*b* can identify which application vDisks are stored locally and then send a communication identifying these application vDisks (or more particularly, identifying any application that is available on a locally stored application vDisk). For example, in FIG. 3A, advertising service 210*b* on client 102 is shown as sending communication 302*a* which identifies that client 102*a* provides Microsoft Word and Adobe Acrobat. Similar communications 302*b*-302*n* can be received from advertising service 210*b* executing on each of clients 102*b*-102*n* identifying the application vDisks (or any application) available on those clients.

In some embodiments, a particular client (or a particular user of a particular client) may not be authorized to access a particular application. Accordingly, advertising service 210*b* may be configured to determine which application vDisks should be made available on a particular client and identify only those application vDisks in its response to the discovery service. To enable this determination, communication 301*a* can include an identifier of the client or of the current user of the client (e.g., a MAC address or other unique identifier of client 102*b* or a username of the user that is logged in to client 102*b* when discovery service 220*b* sends communication 301*a*). Advertising service 210*b* could employ such identifiers in conjunction with a policy (e.g., a group policy object of Active Directory) to identify which applications the client and/or user should be allowed to access. For example, if an applicable policy indicates that the current user of client 102*b* should not be allowed to access Adobe Acrobat, advertising service 210*b* may only identify Microsoft Word in communication 302*a*.

It is noted that, in some embodiments, discovery service 220*b* on client 102*b* can send a communication 301*b* to advertising service 210*b* on the same client 102*b*. In this way, each client can discover which application vDisks it provides using the same techniques by which it discovers which application vDisks the other clients provide. However, in other embodiments, the discovery service can communicate with the advertising service on the same client without employing network communications.

As shown in FIG. 3B, discovery service 220*b* can maintain an application vDisk map 310 which identifies one or more sources of an application. In FIG. 3B, each application is shown as having a single source, but this need not be the case. In particular, in some embodiments, multiple clients may act as a source for a particular application vDisk to provide redundancy and enable better load balancing.

As discovery service 220*b* receives communications 302*a*-302*n*, it can update application vDisk map 310 accordingly so that it provides a current listing of which application vDisks are available and where they can be obtained. To maintain application vDisk map 310 current, discovery service 220*b* can be configured to periodically send out communications 301*a*-301*n*. Accordingly, the primary task of discovery service 220*b* is to identify which applications can be virtualized on the client. Also, to facilitate a user's access to these available applications, discovery service 220*b* (or an associated component of layering module 200) may be configured to generate shortcuts on the user's desktop, start menu, or other user interface area to any application identified in application vDisk map 310 or to modify the operating system to cause the appropriate application to be launched (or more particularly, to be streamed as a virtualized application) whenever a corresponding file type is opened on the client. It is important to note that, at this point, the applications would not yet be available on the client. Instead, the selection of an available virtualized application's shortcut or a request to open a file having a file type handled by the available virtualized application would initiate the process of retrieving the appropriate application vDisk as will be described below.

Figure 4A:
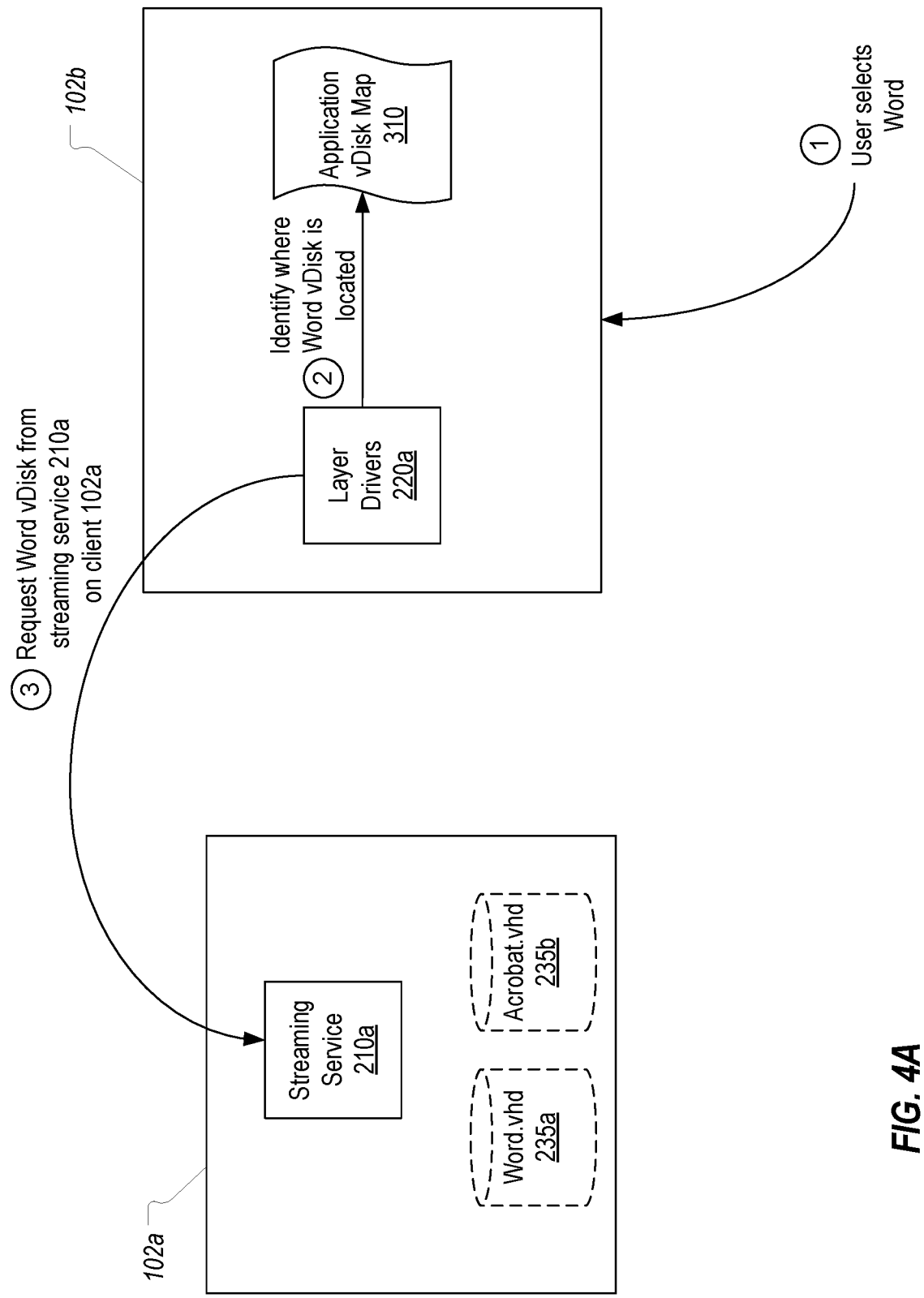
FIG. 4A illustrates how layer drivers of the client component can employ the application vDisk map to identify a client that can provide a particular application vDisk and then communicate with a streaming service of the server component on the identified client to retrieve and mount the particular application vDisk.
Figure 4B:
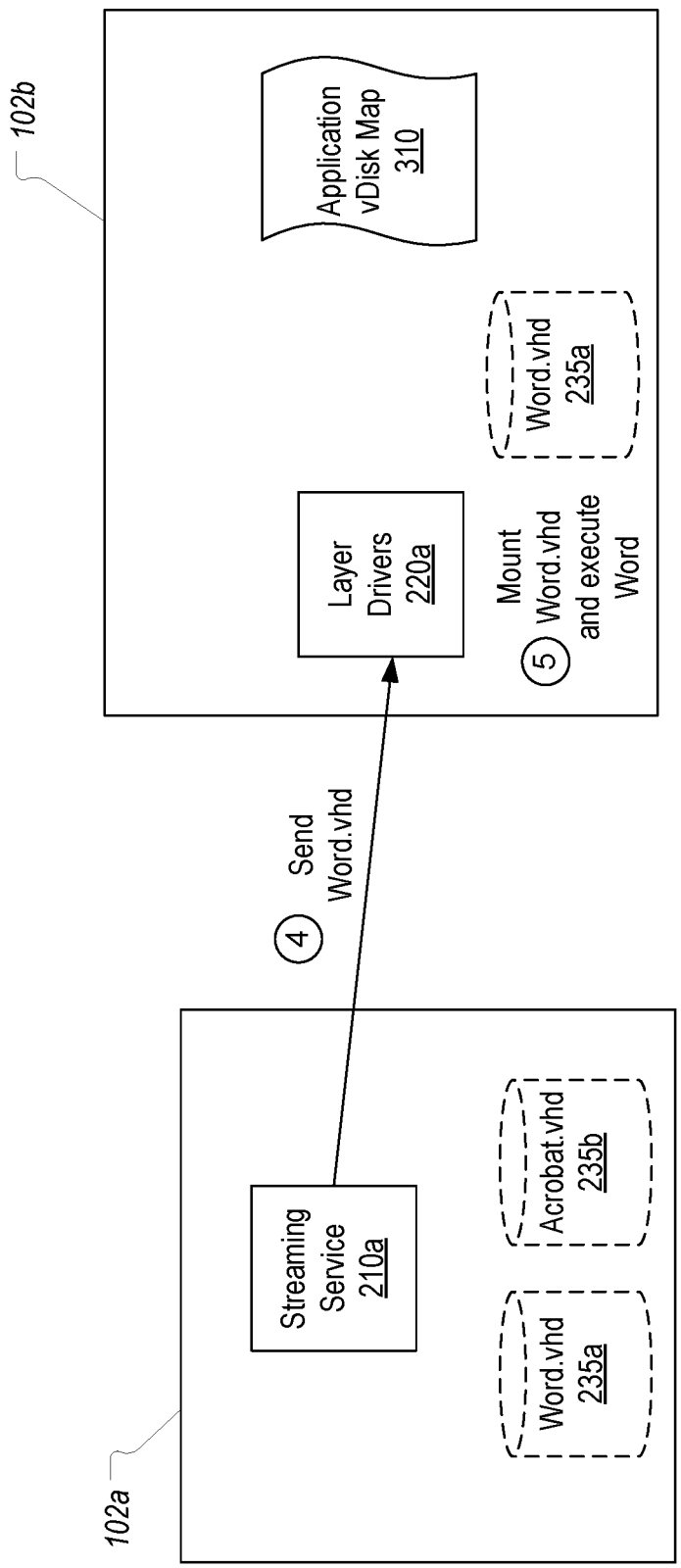
FIG. 4B illustrates how the layer drivers of the client component can unmount an application vDisk once the application(s) on the application vDisk are no longer needed on the client.

FIGS. 4A and 4B generally illustrate how layer drivers 220*a* can interface with streaming service 210*a* to retrieve an application vDisk for mounting on the requesting client thereby making the application(s) on the application vDisk available on the requesting client. These figures will represent the case where a user of client 102*b* desires to open a document in Microsoft Word.

As shown in FIG. 4A, in step 1, a user attempts to open a Word document on client 102*b*. For example, the user may click on a Word document that is attached to an email, may click on a Word document that is stored in a local file system on client 102*b*, or may provide any of the many different types of input that can invoke an application. In response to this user input, layer drivers 220*a* will detect that the user is attempting to execute Microsoft Word. For example, based on the contents of application vDisk map 310, layer drivers 220*a* (or an associated component of layering module 200) may have registered with the operating system to be invoked whenever a file of type .docx is selected.

In any case, layer drivers 220*a* can determine that Microsoft Word should be executed on client 102*b*. Accordingly, in step 2, layer drivers 220*a* can access application vDisk map 310 to determine which client provides Microsoft Word (or more particularly, which client stores Word.vhd). Layer drivers 220*a* can therefore determine that Word.vhd is stored on client 102*a*. In response, in step 3, layer drivers 220*a* can send a request to streaming service 210*a* on client 102*a* to obtain Word.vhd.

As shown in FIG. 4B, in response to the request and in step 4, streaming service 210*a* on client 102*a* can send Word.vhd to layer drivers 220*a* on client 102*b*. Then, in step 5, layer drivers 220*a* can mount Word.vhd on client 102*b* and execute Word to handle the opening of the document that the user selected. In some embodiments, layer drivers 220*a* can abstract the fact that Word.vhd is being streamed as a virtualized application including making the contents of Word.vhd appear as if they were part of the local file system. In any case, once Word.vhd 235*a* is mounted on client 102*b*, the contents of the .vhd file can be accessed in a typical fashion from the user perspective. Once the user has completed using Word (e.g., when the user logs off of client 102*b*), layer drivers 220*a* can unmount Word.vhd so that it will not remain accessible on client 102*b*.

Although the process depicted in FIGS. 4A and 4B is described as being initiated in response to a user requesting to open a Word document, substantially the same process could instead be automatically implemented in response to a user logging in to client 102*b*. In other words, in some embodiments, the peer-to-peer distribution of an application vDisk may be performed at login rather than in response to a specific user request to access the application.

As indicated above, in some embodiments, the present invention could be implemented in a pure peer-to-peer environment. In such cases, the application vDisks could be initially distributed to the clients without the involvement of a server. For example, an administrator could manually load the application vDisks on the appropriate clients. In other embodiments, however, the present invention could be implemented in a hybrid peer-to-peer environment.

Figure 5:
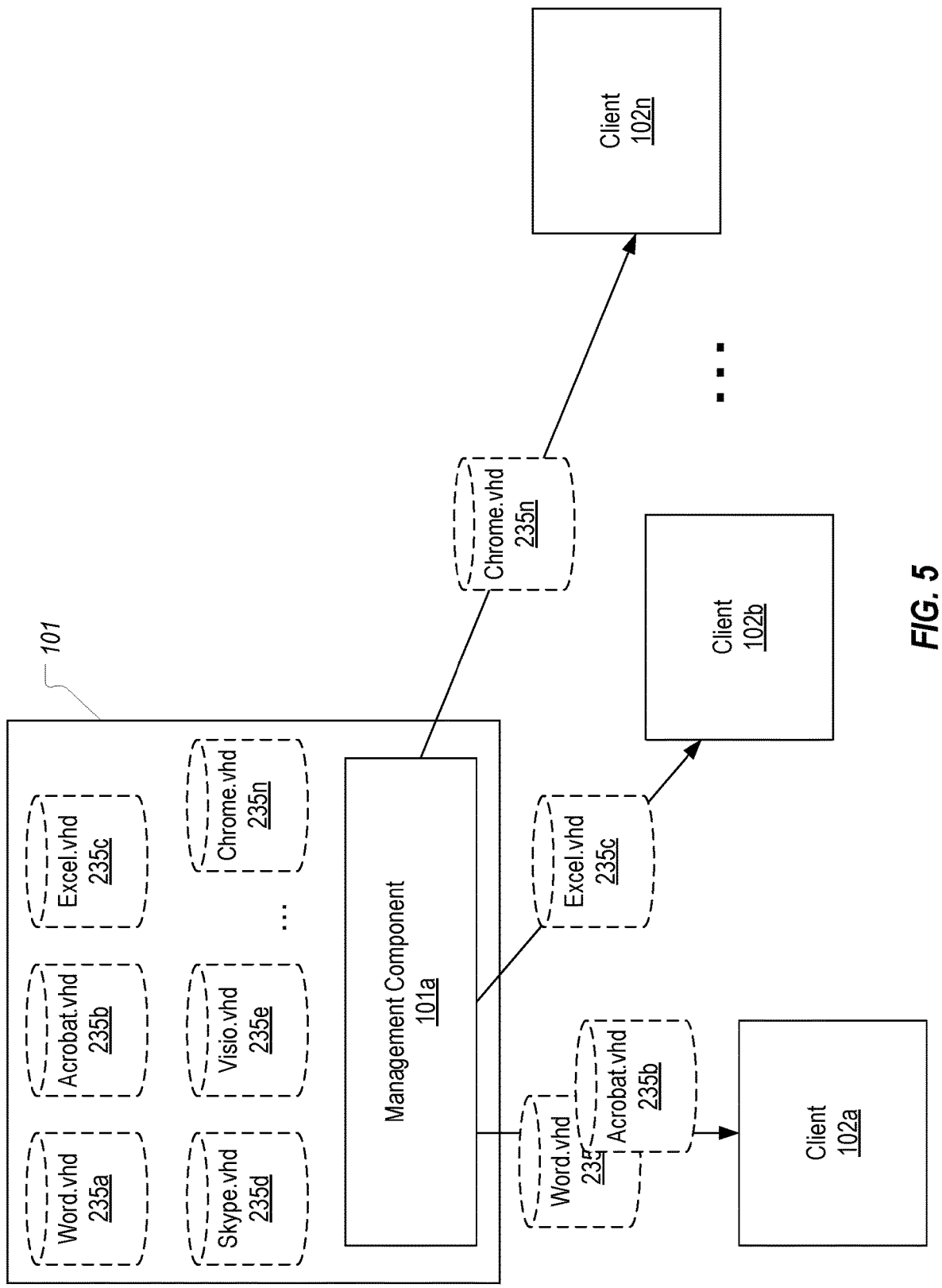
FIG. 5 illustrates how a central server can distribute application vDisks to clients at a location to allow the peer-to-peer distribution model to be implemented at the location.

One benefit of employing a central server as the initial source of application vDisks is that it enables the application vDisks to be centrally managed. FIG. 5 illustrates an example of this type of hybrid environment. In FIG. 5, server 101 is shown as storing each of application vDisks 235*a*-235*n*. Therefore, an administrator of server 101 could easily manage the contents and configuration of application vDisks 235*a*-235*n* including managing which application vDisks are distributed to which clients for subsequent peer-to-peer delivery.

Server 101 is shown as including a management component 101*a* that an administrator could employ to control the distribution of application vDisks to clients. For example, the administrator could specify that Word.vhd 235*a* and Acrobat.vhd 235*b* should be distributed to client 102*a*, that Excel.vhd 235*c* should be distributed to client 102*b*, and that Chrome.vhd 235*n* should be distributed to client 102*n*. In some embodiments, management component 101*a* could be configured to monitor the load on each client that is attributable to streaming service 210*a* to ensure that application vDisks are distributed in a manner that balances the load on each client.

Once an application vDisk is distributed to a client, management component 101*a* may also be configured to detect when the copy of the application vDisk on server 101 has been updated and can then replicate the updated copy to any client on which the application vDisk is stored. This can ensure that the client(s) will deliver an update-to-date version of the application to its peers.

In summary, server 101 can be employed to facilitate the management of application vDisks. However, once an application vDisk is distributed from server 101 to a client, the client will subsequently employ the peer-to-peer distribution model described above to stream the virtualized application to its peers. As best seen in FIG. 5, this peer-to-peer distribution model eliminates the need to have an on premise server for streaming the applications to the clients. The present invention therefore can reduce the overhead required to implement application virtualization.

For example, if an organization opens a new smaller office, the size of the office may not justify the cost and overhead of installing and maintaining an on premise server to stream virtualized applications. However, using the techniques of the present invention, application virtualization could be provided in the small office using only the employees' desktop, laptop, thin client, or other devices. Also, if the organization has a central server, this server could still be employed to oversee the peer-to-peer distribution of virtualized applications in the small office. Accordingly, with minimal investment in software, the organization can provide the benefits of application virtualization to its small office employees.

Figure 6:
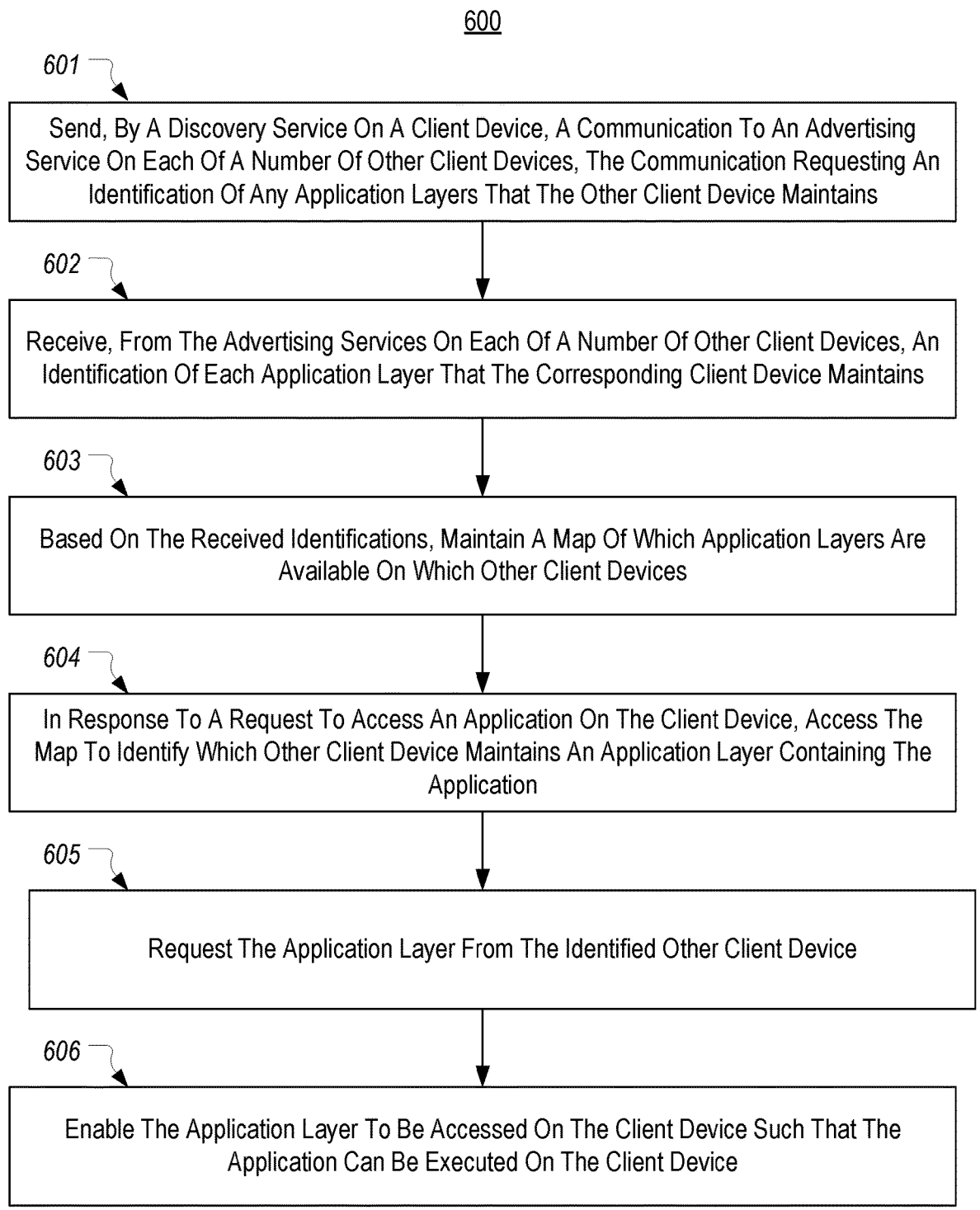
FIG. 6 illustrates a flowchart of an example method for providing application virtualization using a peer-to-peer model.

FIG. 6 illustrates a flowchart of an example method 600 for providing application virtualization using a peer-to-peer model. Method 600 can be implemented by appropriate software on a client device such as layering module 200 on client devices 102*a*-102*n*.

Method 600 includes an act 601 of sending, by a discovery service on a client device, a communication to an advertising service on each of a number of other client devices, the communication requesting an identification of any application layers that the other client device maintains. For example, discovery service 220*b* on client device 102*b* can send communications 301*a*-301*n* to advertising service 210*b* on client devices 102*a*-102*n*.

Method 600 includes an act 602 of receiving, from the advertising services on each of a number of other client devices, an identification of each application layer that the corresponding client device maintains. For example, discovery service 220*b* on client device 102*b* can receive communications 302*a*-302*n* which identify which application vDisks are stored on each of clients 102*a*-102*n*.

Method 600 includes an act 603 of, based on the received identifications, maintaining a map of which application layers are available on which other client devices. For example, discovery service 220*b* can create application vDisk map 310.

Method 600 includes an act 604 of, in response to a request to access an application on the client device, accessing the map to identify which other client device maintains an application layer containing the application. For example, layer drivers 220a could access application vDisk map 310 to determine which of clients 102a-102n stores an application vDisk containing Microsoft Word.

Method 600 includes an act 605 of requesting the application layer from the identified other client device. For example, layer drivers 220a can communicate with streaming service 210a on client 102a to retrieve Word.vhd 235a.

Method 600 includes an act 606 of enabling the application layer to be accessed on the client device such that the application can be executed on the client device. For example, layer drivers 220a can mount Word.vhd 235a on client device 102b. Alternatively, if the application layer is in another format or structure, layer drivers 220a can take appropriate action to make the contents of the application layer accessible on client device 102b.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for providing application virtualization using a peer-to-peer model, the method comprising:
    sending, by a discovery service on a client device, a communication to an advertising service on each of a number of other client devices, the communication requesting an identification of any application layers that the other client device maintains, wherein each application layer is a virtual disk file or a folder that contains at least one application;
    receiving, from the advertising services on each of a number of other client devices, an identification of each application layer that the corresponding client device maintains;
    based on the received identifications, maintaining a map of which application layers are available on which other client devices;
    in response to a request to access an application on the client device, accessing the map to identify which other client device maintains an application layer containing the application;
    requesting the application layer from the identified other client device;
    receiving the application layer from the identified other client device thereby causing the application layer to be stored on the client device; and
    after the application layer is stored on the client device, mounting the application layer on the client device to thereby cause the application contained on the application layer to become accessible as part of a file system such that the application contained on the application layer becomes executable on the client device as a result of the mounting of the stored application layer.

2. The method of claim 1, wherein the application layer that is mounted on the client device is a folder that contains the at least one application.

3. The method of claim 1, wherein the application layer that is mounted on the client device is a virtual disk file that contains the at least one application.

4. The method of claim 1, wherein each of the application layers is a virtual disk file.

5. The method of claim 1, wherein each of the client devices is part of the same LAN or subnet.

6. The method of claim 1, wherein the request to access the application on the client device comprises logging in to the client device.

7. The method of claim 1, wherein the request to access the application on the client device comprises a request to open a file having a file type associated with the application.

8. The method of claim 1, wherein mounting the application layer comprises causing contents of the application layer to appear as if the contents were part of a local file system.

9. The method of claim 1, further comprising:
    sending, by the discovery service on the client device, a communication to an advertising service on the client device, the communication requesting an identification of any application layers that the client device maintains.

10. The method of claim 1, further comprising:
    receiving, by an advertising service on the client device, a communication from a discovery service on at least one of the other client devices, the communication requesting an identification of any application layers that the client device maintains; and sending, to the discovery service on the at least one other client device, an identification of each application layer that the client device maintains.

11. The method of claim 10, further comprising:

for each of the at least one other client device, determining which application layers the other client device should have access to;

wherein sending an identification of each application layer that the client device maintains comprises sending an identification of each application layer that the client device maintains and that the other client device should have access to.

12. The method of claim 10, wherein each application layer that the client device maintains is received from a server.

13. One or more computer storage media storing computer executable instructions which when executed implement a layering module on a client device, the layering module including:

a server component comprising:
an advertising service that is configured to identify which application layers are stored locally on the client device and to respond to requests from other client devices to provide an identification of the locally stored application layers, wherein each application layer is a virtual disk file or a folder that contains at least one application;
a streaming service that is configured to deliver the application layers to the other client devices; and a client component comprising:
a discovery service that is configured to communicate with the advertising service on the other client devices to discover which application layers are locally stored on which other client devices; and
one or more layer drivers that are configured to communicate with the streaming service on the other client devices to retrieve application layers stored locally on the other client devices and to mount a retrieved application layer to provide the one or more applications contained in the retrieved application layer as virtualized applications on the client device, wherein each retrieved application layer is stored on the client device and then mounted on the client device to thereby cause any content stored on the retrieved application layer including the at least one application to become accessible as part of a file system such that the at least one application becomes executable on the client device as a result of the mounting of the stored application layer.

14. The computer storage media of claim 13, wherein the discovery service is also configured to communicate with the advertising service on the client device to discover which application layers are locally stored on the client device.

15. The computer storage media of claim 13, wherein each application layer is a vDisk.

16. The computer storage media of claim 15, wherein the one or more layer drivers are configured to cause contents of a mounted application layer to appear as if the contents were part of a local file system.

17. The computer storage media of claim 13, wherein the server component is further configured to initially obtain the application layers from a central server prior to the streaming service delivering the application layers to the other client devices.

18. The computer storage media of claim 13, wherein the client device and the other client devices are part of the same LAN or subnet.

19. The computer storage media of claim 13, wherein the discovery service is configured to generate a map defining which application layers are available from which client devices, and the one or more layer drivers are configured to employ the map to identify from which client device to obtain a particular application layer.

20. A system for providing application virtualization using a peer-to-peer distribution model, the system comprising:

a plurality of client devices, each client device including:
a server component comprising:
an advertising service that is configured to identify which application layers are stored locally on the client device and to respond to requests from other client devices to provide an identification of the locally stored application layers, wherein each application layer is a virtual disk file or a folder that contains at least one application; and
a streaming service that is configured to deliver the application layers to the other client devices; and a client component comprising:
a discovery service that is configured to communicate with the advertising service on the other client devices to discover which application layers are locally stored on which other client devices; and
one or more layer drivers that are configured to communicate with the streaming service on the other client devices to retrieve application layers stored locally on the other client devices and to mount a retrieved application layer to provide the one or more applications contained in the retrieved application layer as virtualized applications on the client device, wherein each retrieved application layer is stored on the client device and then mounted on the client device to thereby cause any content stored on the retrieved application layer including the at least one application to become accessible as part of a file system such that the at least one application becomes executable on the client device as a result of the mounting of the stored application layer; and a central server configured to initially distribute the application layers among the plurality of client devices.

* * * * *